Oct. 1, 1940.    H. P. NELSON    2,216,250
STAIR TREAD AND FLOOR SLAB SURFACING
Original Filed Aug. 20, 1935
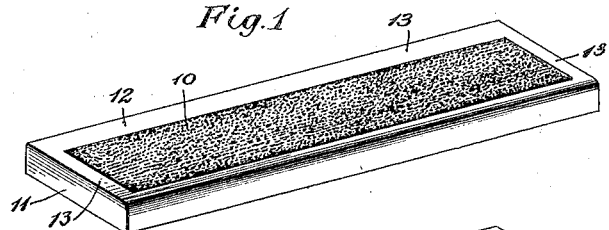
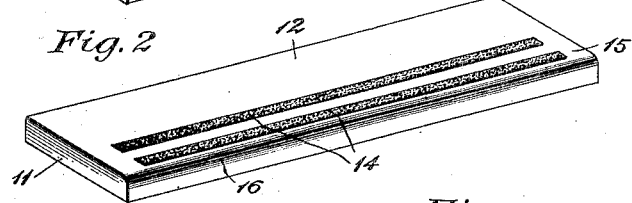
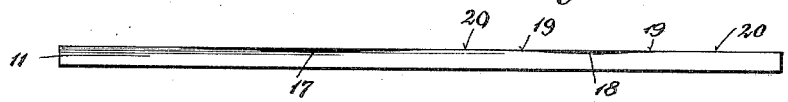
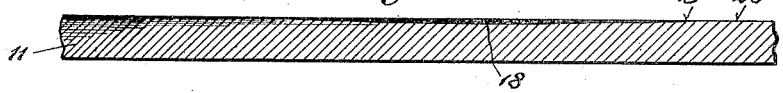
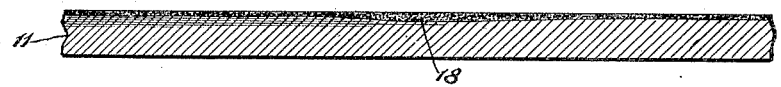
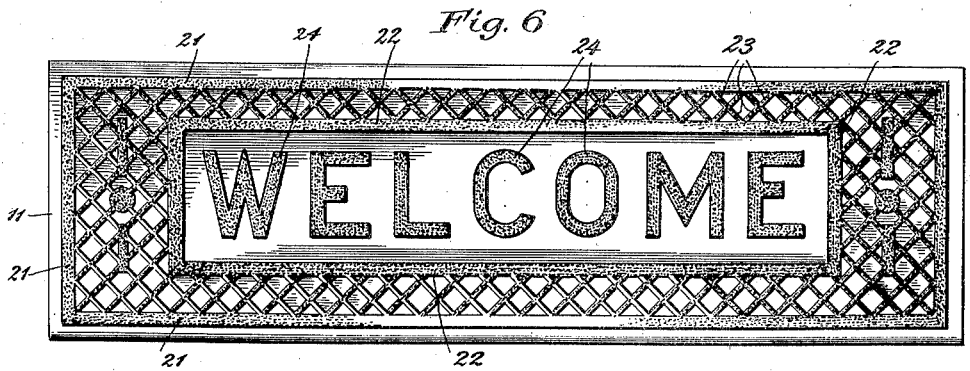
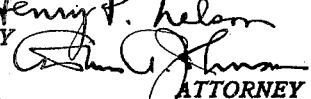
INVENTOR
Henry P. Nelson
BY
ATTORNEY Patented Oct. 1, 1940

2,216,250

UNITED STATES PATENT OFFICE 2,216,250

STAIR TREAD AND FLOOR SLAB SURFACING

Henry P. Nelson, Stratford, Conn.

Application August 20, 1935, Serial No. 36,970
Renewed May 9, 1939

10 Claims. (Cl. 72—96)

This invention concerns applying to stair treads and other surfaces walked upon, a long wearing, non-slipping surface.

The present invention may be applied to new work such as natural or artificial stone stair treads or flooring, in which case the tread or flooring may be manufactured and sold with the hard wear-resisting and non-slipping surface applied, or it may be applied to new work already installed (but not worn) on the premises or location, or it may be applied to worn treads or flooring to restore the same to original or desired form.

As will hereinafter appear, the present invention not only embraces articles of manufacture having on their surfaces the hard wear-resisting, non-slipping material, but also the composition used to surface treads or flooring new or worn, also the method of doing so.

It is a well known fact that, while beautiful in appearance, stone floors and stair treads, especially in public places where they are extensively used, wear very poorly and are very slippery, particularly when somewhat worn and when wet.

Many attempts have been made to provide stair treads especially with means rendering them less slippery and retarding the wear, but the only practical manner of doing so, up until the present invention, consisted in grooving or channeling the surface of the tread most likely to be worn and inserting in such channels or grooves strips or slabs of slow-wearing, non-slipping material. This way of alleviating the difficulty is expensive, and hence its adoption has been very restricted. Moreover, it does not lend itself to employment in the repair of a tread or of flooring already worn.

With the present invention, however, the wear-resisting, non-slipping material need not be set in grooves or channels in the tread and, in fact, the tread need not have anything done to it in use to successfully receive the surface of wear-resisting, non-slipping material.

According to the present invention, this material is applied as a cement directly to the surface to be treated and it may be applied in as thin a layer or as thick a layer as desired, and may be applied in stripes or other designs as desired. The wear-surface material of the present invention may be applied all over the surface of a new or worn tread or floor slab, or it may be applied so as merely to fill in the worn areas of the tread or floor to bring the level of the same flush with the less worn surface. This latter is a very important feature and advantage from an economical standpoint, since, up to the time of this invention, it was impossible to repair deeply worn stone stair treads such as marble, and it has been necessary in order to effect a repair of the stairs, to remove the tread entirely and substitute a new one. As a result, many marble and stone stairs have badly worn treads, and only in those cases where conditions justify the considerable expenditure required to remove and replace a tread has this been done.

The present invention is, therefore, of great economic value in that it provides for the repair and resurfacing of these existing worn stairs and floors, particularly those of marble. The present invention is of great economic and social value also because the surface provided thereby is sufficiently abrasive to prevent persons from slipping and falling with the resultant injury to the person falling and liability thereto of the property owner.

Yet, the surface material of the present invention need not be so abrasive as to unduly wear the shoes of the persons using the stairs and floor and the degree of abrasiveness may be regulated by the character of the abrasive substance employed.

The present invention is economical to practice since the materials employed are not prohibitively costly and since the invention may be practiced by anyone capable of wielding a trowel with sufficient skill to produce a smooth level or curved surface, as desired.

It has long been known that a substance known as "Meyer's German Cement," manufactured in Germany—the exact ingredients of which have been kept secret—serves admirably as a mortar or binder to hold together pieces of marble, but so far as I am aware this is the only practical use to which "Meyer's Cement" has been put heretofore, probably because when set it is extremely hard and smooth.

I have discovered that "Meyer's Cement," when combined with granular abrasive material such as silicon carbide, may be applied in extremely thin layers to steps and slabs of marble, slate, granite and other natural stone or artificial stone such as terrazzo as by a trowel, and that when the same is permitted to set and dry, it remains firmly and securely united to the surface to which it is applied, and that the ingredients, viz., the sharp grits of silicon carbide or similar abrasive substance are firmly united to the cement and do not dust off.

I have found that the grits of friction material permeate the entire coating and remain on the upper surface in sufficient quantities so that when trowelled, a comparatively smooth yet sufficiently abrasive surface is produced to effectually prevent slipping.

I have also found that the inclusion of the silicon carbide, aluminum oxide, or other abrasive grits in the "Meyer's Cement" does not appreciably alter its coefficient of expansion, and that regardless of the thinness of the layer or coating when properly applied, the same does not crack, check, or split off.

I have found that the proportion of grits to "Meyer's Cement" may be varied within large limits depending upon the kind of surface desired, and that while best results are obtained by using "Carborundum," "Alundum," or like grits of one size, uniformity in the size of grits employed is not essential, and that grits of varying sizes may be used together.

Other features and advantages will hereinafter appear.

In the accompanying drawing, there is illustrated by way of example, several ways in which the present invention may be employed—

Figure 1 is a perspective view of a stair tread showing the wear-resisting, non-slipping surface of the present invention applied to substantially the entire surface of the tread.

Fig. 2 is a similar view, but showing the surface of the present invention applied in the form of stripes near the front edge of the tread.

Fig. 3 is a sectional view of a tread such as a marble tread, showing how the same wears in use.

Fig. 4 is a similar view, but showing the resurfacing material of the present invention applied to the deeply worn parts only.

Fig. 5 is a view similar to Fig. 4, showing the worn tread entirely resurfaced with the layer of wear-resisting, non-slipping material of the present invention.

Fig. 6 shows how the surface material of the present invention may be applied to form ornamental designs or letters.

Fig. 7 is a transverse section, showing how a work tread may be reconditioned by the method and means of this invention.

The surfacing composition of the present invention, as above stated, consists of "Meyer's German Cement" mixed with abrasive grits such as grits of "Carborundum," or "Alundum," to have the desired consistency for satisfactory working, and to this coloring material may be added if desired. The proportion of "Meyer's Cement" to grits used may vary to meet varying conditions, but I have found that by volume five parts of "Carborundum" or "Alundum" grits to two parts of "Meyer's Cement" makes a satisfactory surfacing material for almost all purposes.

In practicing the invention, however, unless the given proportions are adhered to, care should be taken not to increase the proportion of "Meyer's Cement" and decrease the proportion of abrasive grits too much, for, unless there is sufficient predominance of grits in the mixture, they will not be effective to render the tread or flooring non-slipping. This is because the "Meyer's Cement" when set and dried is very hard and smooth, and if there is not a sufficient quantity of grits to cause the finished surface to contain a predominance of grits over "Meyer's Cement," a satisfactory non-slipping surface will not be produced.

The cementitious mixture of the present invention is applied to work in the same manner as ordinary finishing cement by being spread on and trowelled down to desired shape, form, and thickness, or it may be applied by means of a mold placed over the surface to which it is to adhere.

As shown in Fig. 1, the composition of the present invention may be applied as a layer 10 to a stair tread or floor slab 11. It need not be applied all over the top surface 12 of the tread slab unless desired. To save material and to ornament the tread, plain borders 13 may be allowed to remain around the periphery of the tread. If desired, it may be applied in the form of one or more stripes 14 as shown in Fig. 2, to the front portion 15 of the upper surface 12 of the stair tread which is the portion most usually worn. In applying these stripes 14 to the tread 11, the composition of the present invention may be applied over the entire front portion 15 of the tread, and then the stripes may be formed by drawing over this portion a board having notches cut out to conform to the width and height of the stripes to remove all the material except the stripes 14.

There are no preparatory operations which must needs be performed in applying the surface coating 10 or the stripes 14 to a tread or floor slab, except to wash the same and remove all traces of dirt or grease, as will be well understood by those skilled in the art. The surface coating 10 or stripes 14 may be applied to treads or floor slabs at their point of origin, the quarry or factory for instance, and the present invention embraces the article of manufacture comprising treads or floor slabs of stone, natural or artificial, to which the hard, wear-resisting, non-slipping composition of the present invention is applied, for these articles may be manufactured and sold for installation in new work or as replacements for old work.

However, for the present, the greater utility of the present invention is believed to reside in the facility with which floor treads or slabs already installed and worn may be reconditioned and restored not only to original form but to better than original form, since, when they are reconditioned, they will be long wearing and non-slipping.

The majority of persons using stairs usually place their feet substantially the same distance from the front edge 16 of the step and approximately the same distance from the banister or handrail with the result that these portions of the steps so engaged are worn to a greater depth than other portions, resulting, usually, in deeply worn portions.

In Fig. 3 there is illustrated, in elevation, a stair tread showing the worn portions 17 and 18. These wells or worn portions not only detract from the appearance of the stairs but when they are wetted collect water in pools which render them still more slippery and difficult to clean.

Heretofore, there was no satisfactory or practical way of alleviating this situation once it had occurred, except to remove the tread entirely and substitute a new one.

I have found experimentally that the composition of the present invention may be advantageously employed to fill these worn portions 17 and 18, and that when so filled the surface may be brought to the level of the unworn portions or the less worn portions of the tread, as shown in Fig. 4. In spite of the fact that in doing so the composition of the present invention is brought to a feather edge as at 19 where it joins the unworn or less worn portions 20 of the tread, the composition adheres firmly to the surface of the tread and does not crack, chip, or break off.

For purely utilitarian purposes, the mere filling in of the depressed portions 17 and 18 of the tread with the composition of the present invention will suffice. It is preferable, however, in repairing a tread or floor slab for appearance sake and so that wearing portions will not be left uncoated to be subjected to subsequent wear, to not only fill in the depressions but also apply to the unworn portions of the tread a thin layer of the composition of the present invention as shown in Fig. 5.

As shown in Fig. 7, the resurfacing material of the present invention may be so applied to the tread as not only to fill the worn portions 18 but cover the tread slightly to the rear as well as to overlie and cover the nose of the tread as shown.

In making the repairs, either in the manner illustrated in Fig. 4 or that illustrated in Figs. 5 and 7, the cementitious abrasive-containing composition of the present invention is applied to the surface and smoothed off with a trowel or board, as any surface layer would be treated.

What has been said above regarding the wearing of stair treads applies also to floor slabs particularly in corridors where the majority of people using the same follow substantially the same path and the repair and refinishing of such slabs may be effected either in the manner illustrated in Fig. 4 or that illustrated in Fig. 5.

I have found that my composition of "Meyer's Cement" and abrasive grits may be applied not only to various kinds of natural stone such as marble, slate, granite and "Alberene," but also to terrazzo or plain cement or concrete, and that it will adhere to all of these firmly and solidly and render the tread or floor slab long wearing and non-slipping.

"Meyer's Cement" being white when mixed with black "Carborundum" grits produces a salt-and-pepper appearance not unlike some forms of granite. It blends well, however, in appearance with marble and hence, when properly applied, does not detract from the appearance of the marble or stone stairway or floor. As above stated, a coloring substance may be added to the composition to make it harmonize with the tread or surrounding things, or to contrast sharply therewith, if desired.

The composition may be worked rather thin—a relatively greater proportion of the special liquid which forms part of "Meyer's German Cement" being added if desired. It may be applied to a tread or floor slab to produce ornamental designs such as shown in Fig. 6, in which the composition is applied to produce an outer border 21, an inner border 22, cross lines 23 between the two, and lettering 24 within the inner border.

In applying the composition of the present invention to a stair slab or floor tread so as to form an ornamental design, a stencil having cutaway portions forming the design is laid on the surface to be coated. The stencil has a thickness equal to the thickness of the coating to be applied. The composition is then spread over the stencil so as to fill the cutaway portions, and when the composition has partly set, the stencil is removed leaving the design raised. The design may be left this way if desired. However, after the composition is sufficiently set, the spaces between the composition as applied may be filled with more composition, usually of a contrasting color or appearance. This would produce, when set and dried, a substantially flush layer having contrasting material forming the design.

If desired, the surface of the tread may be channeled as was heretofore done for the purpose of inserting previously cast and formed non-slipping slabs or treads, and in these channeled portions the long wearing, non-slipping composition of the present invention may be flowed or trowelled off.

However, it is not necessary to do so, for, as shown in Fig. 2, the stripes 14 may be applied directly onto the top surface of the tread in a comparatively thin layer.

Where I have used the expression "Meyer's German Cement" above, it should be understood that any comparable substitute therefor may be employed. "Meyer's German Cement" is a well known article of manufacture of Germany, and at least one attempt has been made to duplicate it in the United States. The domestic substitute product is known as "Vermont White Cement". I have ascertained experimentally that for the purposes above set forth, "Vermont White Cement" may be used with the same facility and effectiveness in all respects as "Meyer's German Cement".

While "Meyer's German Cement" and "Vermont White Cement" have attained a status of standard commodities long and well known in trade, their constituent elements are not generally known.

However, an analysis of "Vermont White Cement," shows the following:

*Powdered ingredients*

|  | Per cent |
|---|---|
| Magnesium oxide | 39.25 |
| Silicon dioxide | 47.60 |
| Zinc sulfide | 1.60 |
| Calcium oxide | 1.80 |
| Iron and aluminum oxides | 2.60 |
| Loss on ignition | 3.60 |
| Undetermined | 3.55 |

*Liquid ingredient*

|  | °Baumé |
|---|---|
| Aqueous magnesium chloride solution | 28 |

The term, marble cement, as used herein, is intended to include Meyer's German Cement and Vermont White Cement or any cement which is a comparable substitute therefor.

Variations and modifications may be made within the scope of this invention and portions of the improvements may be used without others.

Having thus described the invention, what is claimed as new and for which it is desired to obtain Letters Patent, is:

1. The herein described method of resurfacing and repairing worn stair treads and flooring which comprises preparing a mixture of marble cement, hard abrasive material and liquid, applying directly to the worn surface of the same a layer of the mixture in plastic condition, trowelling the layer to the desired form to provide a substantially plane slip-resistant tread surface, and allowing the layer to set and dry hard, said mixture securely bonding with said surface when set.

2. The herein described method of resurfacing and repairing worn stair treads which comprises preparing a mixture of marble cement, hard abrasive material and a liquid, applying directly to the worn surface of the stair tread a layer of the mixture in plastic condition, to fill the worn areas and covering at least the adjacent portions of the surface of the tread, trowelling the layer to level the upper surface thereof to provide a substantially plane slip-resistant tread surface, and allowing the layer to set and dry hard, said mixture securely bonding with said surface when set.

3. As a new article of manufacture, a repaired stone stair tread, said tread having originally a worn and uneven surface; a layer of composition on said surface comprising marble cement and hard abrasive material and of sufficient thickness to make a plane surface; said composition containing a greater proportion of abrasive material than marble cement.

4. As a new article of manufacture, a stone stair tread having securely bonded to the top surface thereof a film-like layer of a composition having as its essential ingredients particles of hard abrasive material and as a binder therefor, marble cement comprising the reaction product of a concentrated aqueous solution of magnesium chloride with a mixture consisting essentially of magnesium oxide, silicon dioxide, and zinc sulphide.

5. As a new article of manufacture, a stone stair tread having securely bonded to at least a portion of the top surface thereof a thin layer of composition having for its essential ingredients hard abrasive material and as a binder therefor, marble cement comprising a modified magnesium oxychloride cement containing zinc sulphide in an amount substantially less than the amount of the cement, and silicon dioxide in an amount slightly in excess of the proportion of the ingredient magnesium oxide of the cement, said composition containing a greater proportion of abrasive material than cement.

6. The herein described method of surfacing stone treads which comprises forming a plurality of spaced grooves in the top surface thereof, trowelling in the grooves, a sufficient quantity of a plastic composition including particles of abrasive material and as a binder therefor, marble cement comprising the reaction product of a concentrated aqueous solution of magnesium chloride with a mixture consisting essentially of magnesium oxide, silicon dioxide, and zinc sulphide, to completely fill the same, and allowing the composition to set and harden.

7. An antislip stair tread unit comprising a stone tread having on the top surface thereof a plurality of spaced grooves completely filled with a composition including particles of abrasive material and as a binder therefor, marble cement comprising the reaction product of a concentrated aqueous solution of magnesium chloride with a mixture consisting essentially of magnesium oxide, silicon dioxide, and zinc sulphide, said composition containing a greater proportion of abrasive material than binder.

8. The herein described method of resurfacing and repairing worn stair treads which comprises preparing a plastic composition including hard abrasive material, and as a binder therefor, marble cement comprising a concentrated aqueous magnesium chloride solution and a mixture consisting essentially of magnesium oxide, silicon dioxide, and zinc sulphide; applying a layer of the composition in plastic condition directly to the worn surface at the forward edge of the same; trowelling the layer to the desired form to provide on the top surface of the tread a substantially plane slip-resistant tread surface; continuing the trowelling to extend the mixture down over the forward portion of the tread to form a nosing; and allowing the layer to set and dry hard, said mixture securely bonding with the surface to which it is applied when set.

9. The herein described method of surfacing stone stair treads which comprises preparing a plastic composition including hard abrasive material, and as a binder therefor, marble cement comprising a concentrated aqueous magnesium chloride solution and a mixture consisting essentially of magnesium oxide, silicon oxide, and zinc sulphide; applying a layer of the composition in plastic condition directly to the surface of the tread; forming the layer into stripes by removing spaced-apart portions of the plastic layer before the same has set and hardened, and allowing the stripes so formed to set and harden.

10. The herein described method of surfacing stone treads which comprises preparing a mixture of marble cement, hard abrasive material and a liquid, positioning a stencil having cutaway portions forming an ornamental design on the top surface of the tread to be surfaced, filling in the cutaway portions of the stencil with said mixture in plastic condition, trowelling the same to form on the top surface of the tread a layer of the mixture having a thickness equal to the thickness of the stencil, allowing the mixture to partly set, removing the stencil, and allowing the mixture to set and harden.

HENRY P. NELSON.